(12) United States Patent
Adams

(10) Patent No.: US 8,004,606 B2
(45) Date of Patent: Aug. 23, 2011

(54) ORIGINAL SCAN LINE DETECTION

(75) Inventor: Dale Richard Adams, Gualala, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 1028 days.

(21) Appl. No.: 11/487,144

(22) Filed: Jul. 13, 2006

(65) Prior Publication Data

US 2007/0052864 A1  Mar. 8, 2007

Related U.S. Application Data

(60) Provisional application No. 60/715,711, filed on Sep. 8, 2005.

(51) Int. Cl.
*H04N 7/01* (2006.01)
*H04N 5/14* (2006.01)
*H04N 9/64* (2006.01)
*H04N 11/20* (2006.01)

(52) U.S. Cl. .................. 348/448; 348/446; 348/701

(58) Field of Classification Search ............ 348/446, 348/448, 701
See application file for complete search history.

(56) References Cited

U.S. PATENT DOCUMENTS

| | | | |
|---|---|---|---|
| 5,357,606 A | 10/1994 | Adams | |
| 5,532,751 A | 7/1996 | Lui | |
| 5,550,592 A | 8/1996 | Markandey et al. | |
| 5,689,301 A | 11/1997 | Christopher et al. | |
| 5,796,875 A | 8/1998 | Read | |
| 5,828,786 A * | 10/1998 | Rao et al. ............. | 382/236 |
| 5,857,118 A | 1/1999 | Adams et al. | |
| 5,920,356 A | 7/1999 | Gupta et al. | |
| 6,055,018 A | 4/2000 | Swan | |
| 6,064,776 A | 5/2000 | Kikuchi et al. | |
| 6,069,664 A * | 5/2000 | Zhu et al. ............. | 348/448 |
| 6,167,164 A | 12/2000 | Lee et al. | |
| 6,219,747 B1 | 4/2001 | Banks et al. | |
| 6,285,801 B1 | 9/2001 | Mancuso et al. | |
| 6,380,978 B1 | 4/2002 | Adams et al. | |
| 6,385,692 B2 | 5/2002 | Banks et al. | |
| 6,393,505 B1 | 5/2002 | Scalise et al. | |
| 6,421,090 B1 | 7/2002 | Jiang et al. | |
| 6,459,455 B1 | 10/2002 | Jiang et al. | |
| 6,473,476 B1 | 10/2002 | Banks | |

(Continued)

FOREIGN PATENT DOCUMENTS

EP  0881837  12/1998

(Continued)

OTHER PUBLICATIONS

"Analog Devices CMOS 180 MHz DDS/DAC Synthesizer", AD9851, Rev. C, Analog Devices, Inc., www.analog.com.pp. 1-23 (1999).

(Continued)

*Primary Examiner* — Brian Yenke
(74) *Attorney, Agent, or Firm* — Blakely Sokoloff Taylor & Zafman

(57) ABSTRACT

A technique for detecting original scan lines is disclosed. The technique involves receiving a deinterlaced signal with even scan lines and odd scan lines. After the deinterlaced signal is received, a determination is made as to whether the even scan lines or the odd scan lines are the original scan lines. In certain embodiments, an interlaced signal can be generated from the original scan lines. In other embodiments, an optimized deinterlaced signal can be generated using the original scan lines.

25 Claims, 8 Drawing Sheets

U.S. PATENT DOCUMENTS

| | | | |
|---|---|---|---|
| 6,489,998 B1 | 12/2002 | Thompson et al. | |
| 6,515,706 B1 | 2/2003 | Thompson et al. | |
| 6,525,774 B1 * | 2/2003 | Sugihara | 348/459 |
| 6,542,199 B1 * | 4/2003 | Manbeck et al. | 348/459 |
| 6,587,158 B1 | 7/2003 | Adams et al. | |
| 6,681,059 B1 | 1/2004 | Thompson | |
| 6,700,622 B2 * | 3/2004 | Adams et al. | 348/448 |
| 6,757,022 B2 | 6/2004 | Wredenhagen et al. | |
| 6,757,442 B1 | 6/2004 | Avinash | |
| 6,859,237 B2 | 2/2005 | Swartz | |
| 6,867,814 B2 | 3/2005 | Adams et al. | |
| 6,870,562 B2 * | 3/2005 | Johnson et al. | 347/262 |
| 6,999,047 B1 * | 2/2006 | Holtslag | 345/60 |
| 7,023,487 B1 | 4/2006 | Adams | |
| 7,027,099 B2 | 4/2006 | Thompson et al. | |
| 7,089,577 B1 | 8/2006 | Rakib et al. | |
| 7,126,643 B2 | 10/2006 | Song et al. | |
| 7,136,541 B2 | 11/2006 | Zhang et al. | |
| 7,154,555 B2 * | 12/2006 | Conklin | 348/448 |
| 7,154,556 B1 | 12/2006 | Wang et al. | |
| 7,167,977 B2 * | 1/2007 | Morris et al. | 713/1 |
| 7,206,025 B2 | 4/2007 | Choi et al. | |
| 7,236,209 B2 | 6/2007 | Martin | |
| 7,345,708 B2 | 3/2008 | Winger et al. | |
| 7,349,028 B2 | 3/2008 | Neuman et al. | |
| 7,349,029 B1 * | 3/2008 | Chou | 348/448 |
| 7,362,376 B2 | 4/2008 | Winger et al. | |
| 7,391,468 B2 | 6/2008 | Shah | |
| 7,400,359 B1 | 7/2008 | Adams | |
| 7,412,096 B2 | 8/2008 | Neuman et al. | |
| 7,414,671 B1 | 8/2008 | Gallagher et al. | |
| 7,417,686 B2 * | 8/2008 | Zhu | 348/448 |
| 7,474,354 B2 | 1/2009 | Kawamura et al. | |
| 7,515,205 B1 | 4/2009 | Wang et al. | |
| 7,519,332 B1 | 4/2009 | Suematsu | |
| 7,528,426 B2 | 5/2009 | Neuman | |
| 7,554,602 B2 * | 6/2009 | Liao et al. | 348/441 |
| 7,557,861 B2 | 7/2009 | Wyman | |
| 7,605,866 B2 * | 10/2009 | Conklin | 348/448 |
| 7,659,939 B2 | 2/2010 | Winger et al. | |
| 7,667,773 B2 | 2/2010 | Han | |
| 7,710,501 B1 | 5/2010 | Adams et al. | |
| 2002/0149685 A1 | 10/2002 | Kobayashi et al. | |
| 2002/0149703 A1 | 10/2002 | Adams et al. | |
| 2003/0156301 A1 * | 8/2003 | Kempf et al. | 358/486 |
| 2004/0042673 A1 * | 3/2004 | Boon | 382/239 |
| 2004/0189877 A1 | 9/2004 | Choi et al. | |
| 2005/0046741 A1 * | 3/2005 | Wu | 348/452 |
| 2005/0122433 A1 | 6/2005 | Satou et al. | |
| 2005/0128360 A1 | 6/2005 | Lu | |
| 2005/0129306 A1 * | 6/2005 | Wang et al. | 382/156 |
| 2005/0243204 A1 * | 11/2005 | Zhu | 348/448 |
| 2006/0072037 A1 | 4/2006 | Wyman | |
| 2007/0052845 A1 | 3/2007 | Adams | |
| 2007/0103588 A1 | 5/2007 | Macinnis et al. | |
| 2007/0223835 A1 | 9/2007 | Yamada et al. | |
| 2008/0123998 A1 | 5/2008 | Gomi et al. | |
| 2008/0143873 A1 | 6/2008 | Neuman | |
| 2008/0151103 A1 | 6/2008 | Asamura et al. | |
| 2009/0196500 A1 * | 8/2009 | Shi et al. | 382/168 |

FOREIGN PATENT DOCUMENTS

| | | |
|---|---|---|
| EP | 1039760 | 9/2000 |
| EP | 1434438 A2 | 6/2004 |
| EP | 1492344 A1 | 12/2004 |
| JP | 2001-245155 | 9/2001 |
| JP | 2005122361 A | 5/2005 |
| JP | 2007213125 A | 8/2007 |

OTHER PUBLICATIONS

International Search Report PCT/US2006/034785 dated Apr. 4, 2007.
International Search Report PCT/US2007/084881 dated Mar. 25, 2008.
Co-pending U.S. Appl. No. 10/753,909, filed Jul. 7, 2004.
Co-pending U.S. Appl. No. 10/889,855, filed Jul. 12, 2004.
Co-pending U.S. Appl. No. 111512,754, filed Aug. 29, 2006.
Co-pending U.S. Appl. No. 11/941,050, filed Nov. 15, 2007.
Co-pending U.S. Appl. No. 12/204,760, filed Sep. 4, 2008.
Co-pending U.S. Appl. No. 12/703,623, filed Feb. 10, 2010.
Co-pending U.S. Appl. No. 11/437,357, filed May 19, 2006.
International Search Resort PCT/US2009/054427 dated Mar. 17, 2009 pp. 1-3.
International Search Report PCT/US2010023775 dated Oct. 11, 2010, pp. 1-3.
Supplementary European Search Report 06 814 256 dated Mar. 31, 2010, pp. 1-7.
Non-Final Office Action mailed Mar. 18, 2008 for Issued Patent No. 7,400,359, U.S. Appl. No. 10/753,909, filed Jan. 7, 2004.
Non-Final Office Action mailed Sep. 11, 2009 for Issued Patent U.S. Patent No. 7,710,501, U.S. Appl. No. 10/889,855, filed Jul. 12, 2004.
Non-Final Office Action mailed Sep. 23, 2010 for U.S. Appl. No. 11/437,357, filed May 19, 2001.
Notice of Allowance mailed Feb. 8, 2010 for Issued Patent No. 7,710,510, U.S. Appl. No. 10/889,855, filed Jul. 12, 2004.
Notice of Allowance mailed May 30, 2008 for Issued Patent No. 7,400,359, U.S. Appl. No. 10/753,909, filed Jan. 7, 2004.
Notice of Allowance mailed Sep. 3, 2010 for U.S. Appl. No. 11/512,754, filed Aug. 29, 2006.
Restriction Requirement mailed Feb. 25, 2010 for U.S. Appl. No. 11/437,357, filed May 19, 2006.
Written Opinion PCT/US2006/34785 dated Apr. 4, 2007, pp. 1-4.
Written Opinion PCT/US2007/084881 dated Mar. 25, 2008 pp. 1-4.
Written Opinion PCT/US2009/054427 dated Mar. 17 2010 pp. 1-3.
Written Opinion PCT/US2010/023775 dated Oct. 11, 2010, pp. 1-5.
Non-Final Office Action for U.S. Appl. No. 11/512,754 mailed Jun. 25, 2010.
Non-Final Office Action for U.S. Appl. No. 11/512,754 mailed Dec. 13, 2010.
Non-Final Office Action for U.S. Appl. No. 11/941,050 mailed Feb. 1, 2011.
Notice of Allowance for U.S. Appl. No. 11/512,754 mailed Feb. 7, 2011.
Office Action for European Patent Application No. 06814256.1 mailed Jul. 16, 2010.
Office Action for Canadian Patent Application No. 2,620,820 mailed Aug. 18, 2010.
Notice of Allowance for U.S. Appl. No. 11/437,357 mailed Dec. 1, 2010.
Notice of Allowance for U.S. Appl. No. 11/437,357 mailed Mar. 9, 2011.
Office Action for European Patent Application No. 06814256.1 mailed Feb. 10, 2011.
Non-Final Office Action for U.S. Appl. No. 11/512,754 mailed May 11, 2011.
International Preliminary Report on Patentability for International Patent Application No. PCT/US2009/054427, Mailed Mar. 17, 2011, 5 pages.

* cited by examiner

ORIGINAL SCAN LINE DETECTION

CROSS-REFERENCE TO RELATED PATENTS AND PATENT APPLICATIONS

The present application claims priority to and incorporates by reference the teaching of SOURCE-ADAPTIVE VIDEO DEINTERLACER provisional patent application No. 60/715,711, filed Sep. 8, 2005.

BACKGROUND

The conventional wisdom is that a progressive (i.e. deinterlaced) signal is superior to an interlaced signal. A progressive signal displays an entire frame while an interlace picture delivers two fields; one with even scan lines and one with odd scan lines. As such, a progressive signal displays a crisper, more brilliant picture without flicker. A progressive signal is also less susceptible to interlace or motion artifacts.

There are a variety of techniques that may be implemented to deinterlace a signal. However, not all deinterlaced signals are of the same quality. Most deinterlacers employ vertical interpolation, weave or a motion adaptive technique to deinterlace an interlaced signal. Other advanced techniques utilize edge detection or other similar techniques to deinterlace an interlaced signal. A problem is that once the interlaced signal is deinterlaced, the resulting progressive signal includes any inadequacies inherent in the particular deinterlacing process that is used.

What is needed is a method, system and device that detects original scan lines in a deinterlaced signal. What is further needed is method, system and device that generates an interlaced signal from original scan lines detected in a deinterlaced signal. What is further needed is a method, system and device to detect and extract the original scan lines from a deinterlaced signal, and then generates an optimized deinterlaced signal using those original scan lines.

The foregoing examples of the related art and limitations related therewith are intended to be illustrative and not exclusive. Other limitations of the related art will become apparent to those of skill in the art upon a reading of the specification and a study of the drawings.

SUMMARY OF THE INVENTION

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for interlacing a deinterlaced signal involves determining original scan lines. An example of a method according to the technique involves receiving a deinterlaced signal with even scan lines and odd scan lines. The deinterlaced signal can be analyzed to determine whether the even scan lines or the odd scan lines are the original scan lines. Once the determination is made, an interlaced signal can be generated from the original scan lines.

In additional embodiments, the interlaced signal can be received and deinterlaced. The deinterlacing can involve advanced techniques and produce an optimized deinterlaced signal. The optimized deinterlaced signal can be provided as an output. In some embodiments, the advanced techniques can include edge detection techniques and cadence detection techniques. In other embodiments, the interlaced signal can be received from a set-top box or progressive DVD player.

In one embodiment, determining the original scan lines can involve calculating odd scan lines using the even scan lines in a frame. Even scan lines can also be calculated using the odd scan lines in the frame. If the calculated odd scan lines are closer to the odd scan lines in the frame than calculated even scan lines are to the even scan lines in the frame, then the even scan lines can be selected as the original scan lines. However, if the calculated even scan lines are closer to the even scan lines in the frame than the calculated odd scan lines are to the odd scan lines in the frame, then the odd scan lines can be selected as the original scan lines.

In certain embodiments, the comparison of calculated scan lines and scan lines in the frame can be facilitated by taking a magnitude of a difference between the scan lines. Scan lines that have the lowest difference magnitude can be considered closer than scan lines that have a higher difference magnitude.

In some embodiments, an alternating pattern exists if calculated even scan lines are closer to even scan lines in one frame and calculated odd scan lines are closer to odd scan lines in an adjacent frame. In one embodiment, the selection of original scan lines can be made after a predetermined number of consecutive frames are consistent with the alternating pattern. In another embodiment, if a current selection of original scan lines disagrees with the alternating pattern, the current selection of original scan lines can be made to be consistent with the alternating pattern.

An example of a device according to the technique includes an input, an original scan line module and an output. The input can receive a deinterlaced signal. The original scan line module can detect which scan lines in the deinterlaced signal are original scan lines. The output can provide a deinterlaced signal with original scan lines.

In a further embodiment, the device can include an alternate pattern detector. The alternate pattern detector can be capable of analyzing at least two frames and determining whether a toggle pattern exists. In certain embodiments, the toggle pattern can signify that calculated scan lines are close to the actual scan lines in a given frame, and that the calculated scan lines are further from the actual scan lines in the following frame. In one embodiment, calculated even scan lines can be generated using odd scan lines and calculated odd scan lines can be generated using even scan lines.

In another embodiment, the device can include a selector. The selector can select the even scan lines as being original scan lines in a third frame if the calculated odd scan lines are closer to the odd scan lines in the first frame. The selector can also select the odd scan lines as being original scan lines in the third frame if the calculated even scan lines are closer to the even scan lines in the first frame.

In additional embodiments, the device can include a buffer. In alternate embodiments, the buffer can be a shift-register or a counter. In other embodiments, the device can further include a second input, a deinterlacer and a second output. The second input can receive the interlaced signal with the original scan lines. The deinterlacer can optimally deinterlace the interlaced signal. The output can provide an optimized deinterlaced signal. In certain embodiments, a single chip can receive the deinterlaced signal and provide the optimized deinterlaced signal.

Another method according to the technique involves comparing a vertical high frequency content of even scan lines with a vertical high frequency content of odd scan lines. In one embodiment, the even scan lines can be selected as the original scan lines if the vertical high frequency content of the even scan lines is higher than the vertical high frequency content of the odd scan lines. In another embodiment, the odd scan lines can be selected as the original scan lines if the vertical high frequency content of the odd scan lines is higher than the vertical high frequency content of the even scan lines.

In certain embodiments, a difference between pixels in adjacent scan lines in the even scan lines and odd scan lines can be calculated to determine the highest vertical high frequency content. In other embodiments, the comparison can be facilitated by using high performance filters on the even and the odd scan lines.

The proposed system, method and device can offer, among other advantages, an interlaced signal with original scan lines from a deinterlaced source. Advantageously, the proposed system, method and device can detect original scan lines by calculating even and odd scan lines and performing comparisons with scan lines in the frame to determine which scan lines are the original scan lines. In addition, the proposed system, method and device can deinterlace the interlaced signal using optimized deinterlacing techniques. The result is an optimized deinterlaced signal from a deinterlaced source. These and other advantages of the present invention will become apparent to those skilled in the art upon a reading of the following descriptions and a study of the several figures of the drawings.

BRIEF DESCRIPTION OF THE DRAWINGS

Embodiments of the inventions are illustrated in the figures. However, the embodiments and figures are illustrative rather than limiting; they provide examples of the invention.

DETAILED DESCRIPTION OF THE DRAWINGS

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
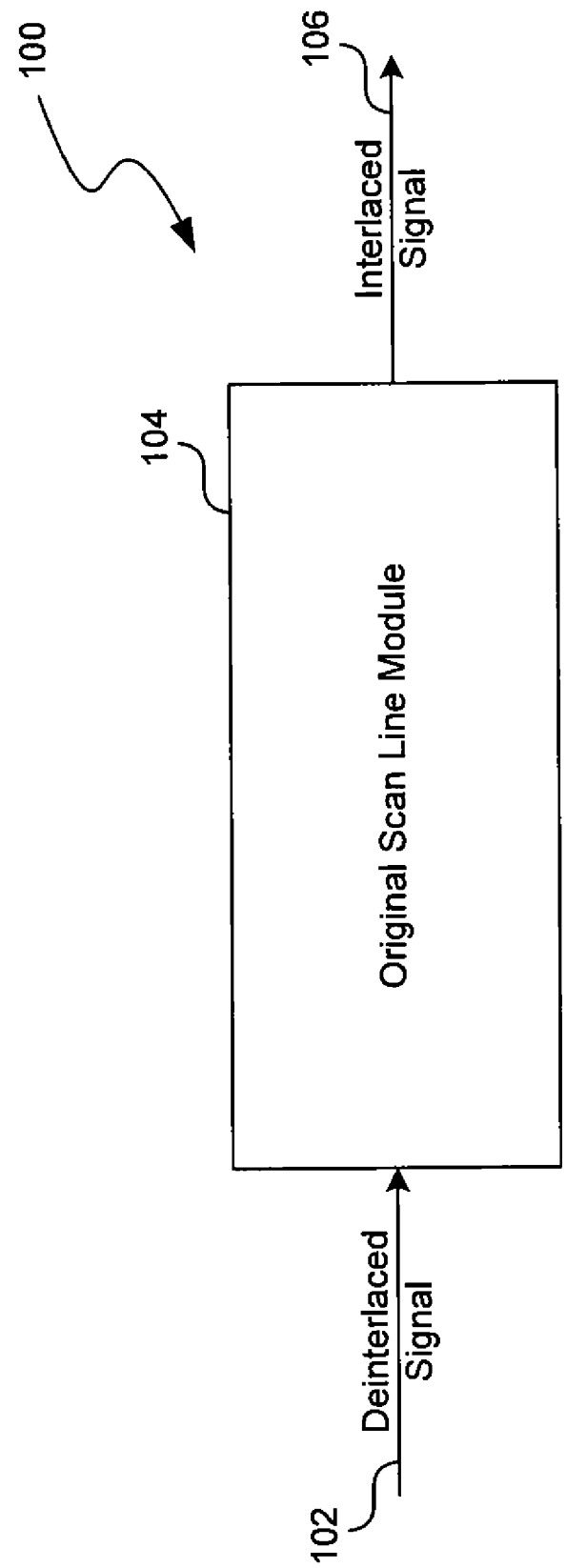
FIG. 1 depicts an example of an interlacing system.

FIG. 1 depicts an example of a system 100 for interlacing a deinterlaced signal. In the example of FIG. 1, the system 100 includes an input 102, an original scan line module 104 and an output 106. As shown, the input 102 is a deinterlaced signal. The deinterlaced signal 102 is provided to the original scan line module 104. The original scan line module 104 detects original scan lines in the deinterlaced signal and generates an interlaced signal with original scan lines. The original scan line module 104 provides the interlaced signal as an output 106. In certain embodiments, original scan lines are the scan lines in an original interlaced signal. In those embodiments, the original interlaced signal is deinterlaced to create the deinterlaced signal which is provided as an input 102.

The source of the deinterlaced signal can be any known and/or convenient device capable of providing a deinterlaced signal. For example, the deinterlaced signal can be provided from a cable set-top box, satellite set-top box, receiver, DVD player, HD-DVD player, computer, video recorder, television or any other device capable of providing a deinterlaced, or progressive, video signal. In certain embodiments, the deinterlaced signal is provided by a source that uses less than optimal techniques to deinterlace the original interlaced signal.

The original scan line module can use any convenient and/or known technique capable of detecting original scan lines in the deinterlaced signal and/or recover an interlaced signal from the deinterlaced signal. For example, the original scan line module can use the even scan lines in one frame to calculate odd scan lines. Following the example, the original scan line module can use the odd scan lines in the frame to calculate even scan lines. The odd scan lines in the frame can be compared with the calculated odd scan lines and the even scan lines in the frame can be compared with the calculated even scan lines. The scan lines in the frame that are able to generate calculated scan lines that are the closest to the scan lines in the frame can be designated as original scan lines.

In certain embodiments, the calculation of scan lines can be similar to vertical interpolation. Vertical interpolation involves averaging at least two known scan lines to generate data for an unknown scan line. The technique is repeated for all scan lines and creates a full frame from a single video field. Using the foregoing example, the calculated scan lines can be the unknown scan lines and the even or odd scan lines used to generate the calculated scan lines can be the known scan lines.

In other embodiments, vertical high frequency content from a field can be used to determine original scan lines. For example, vertical high frequency content of the even scan lines can be compared with the vertical high frequency content of the odd scan lines. The scan lines with the highest vertical high frequency content can be designated as original scan lines.

The interlaced signal can be created and provided as an output using any known and/or convenient technique. For example, after the original scan lines are detected, the original even scan lines can be used to create an even scan line field and the original odd scan lines can be used to create an odd scan line field. The output signal can provide the even field followed by the odd field to produce an interlaced video output with a field rate equal to the frame rate of the deinterlaced input signal. In an alternate embodiment, the even scan line field and the odd scan line field can be deinterlaced using advanced techniques to generate an optimal deinterlaced video output.

Figure 2:
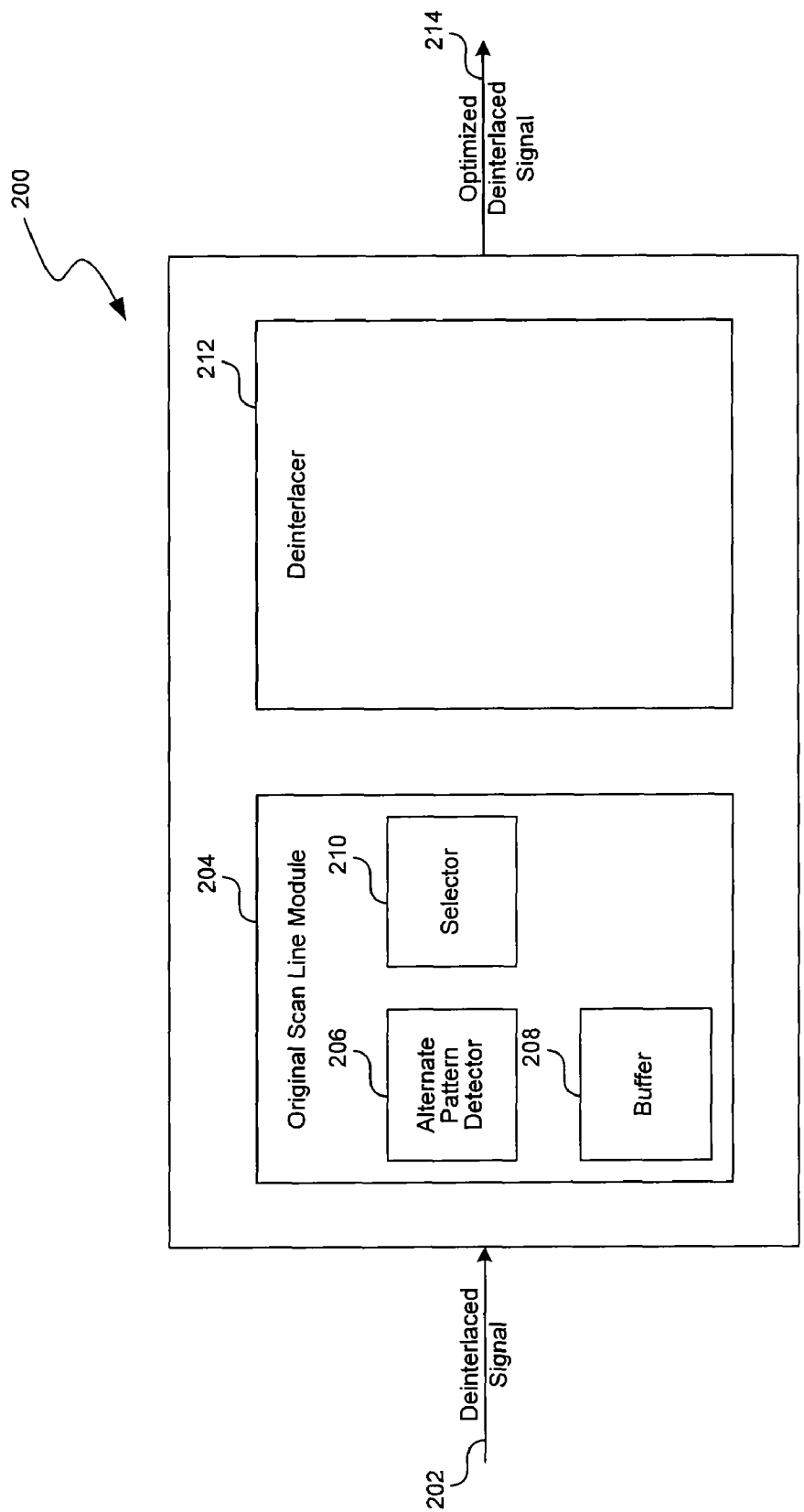
FIG. 2 depicts an example of an interlacing system coupled with an optimized deinterlacer.

FIG. 2 depicts an example of a system 200 for producing an optimized deinterlaced output from a (non-optimal) deinterlaced input. As shown in the example of FIG. 2, the system 200 includes an input 202, an original scan line module 204, an alternate pattern detector 206, a buffer 208, a selector 210, a deinterlacer 212, and an output 214. The input 202 is a deinterlaced signal which can be received from any known and/or convenient device capable of providing a deinterlaced, or progressive, signal.

The original scan line module 204 includes an alternate pattern detector 206. The alternate pattern detector 206 can determine whether an alternating pattern exists. For example, the alternate pattern detector can calculate the odd scan lines using even scan lines in the frame and calculate even scan lines using odd scan lines in the frame. If the calculated odd scan lines are closer to the odd scan lines in the frame, then an alternating pattern exists if the calculations are again made for the following frame and the calculated even scan lines are closer to the even scan lines in the following frame.

In certain embodiments, the selection of original scan lines is locked if the alternating pattern exists for a predetermined number of frames. The buffer 208 can be used to store previous data of the alternating pattern. The buffer can any known and/or convenient device capable of storing digital information. For example, the buffer can be a counter, a shift-register, cache or any other type of memory device and/or region of memory used to temporarily hold and/or store data.

As shown in the example of FIG. 2, the original scan line module also includes a selector 210. The selector can be any known and/or convenient device capable of selecting original scan lines. In one example, the selector uses the even scan lines in a frame to calculate odd scan lines. Furthering the example, the selector uses odd scan lines in the frame to calculated even scan lines. In other examples, the selector uses the calculations generated by the alternate pattern detector. In an alternative example, the alternate pattern detector uses calculations generated by the selector.

In one embodiment, if the calculated odd scan lines are closer to the odd scan lines in the frame, the selector selects the odd scan lines as the original scan lines in the next frame. Conversely, if the calculated even scan lines are closer to the even lines in the frame, the selector selects the even scan lines as the original scan lines in the next frame. In additional embodiments, the selector only selects the original lines in the next frame if an alternating pattern has been detected for a predetermined number of previous frames. If the alternating pattern is not detected, or the alternating pattern is not present for the required period, then the previous selection is toggled every frame.

In alternate embodiments, the original scan line module 204, alternate pattern detector 206, buffer 208 and selector 210 can have a variety of names and perform a variety of additional tasks. In other embodiments, some or all of the tasks described above can be performed by any or all the components. For example, the original scan line module 204, alternate pattern detector 206, buffer 208 and selector 210 can be integrated on a single chip and/or single piece of software without being physically distinct.

In the example of FIG. 2, the system 200 also includes a deinterlacer 212. As shown in FIG. 2, the original scan line module 204 and deinterlacer 212 are integrated on a single chip 200. In one embodiment, the deinterlacer 212 uses the results of the original scan line module to create an optimized deinterlaced signal. The deinterlacer can use any known and/or convenient deinterlacing technique capable of deinterlacing a source having even and odd fields. In further embodiments, the deinterlacer 212 can employ advanced techniques to increase the quality of the signal, such as those described in U.S. patent application Ser. No. 11/437,357, "Edge Detection" filed on May 19, 2006 incorporated herein by reference. The deinterlacer 212 provides an optimized deinterlaced signal as the output 214 of the system. In one embodiment, the optimized deinterlaced signal can be generated using advanced techniques such as edge detection.

Figure 3:
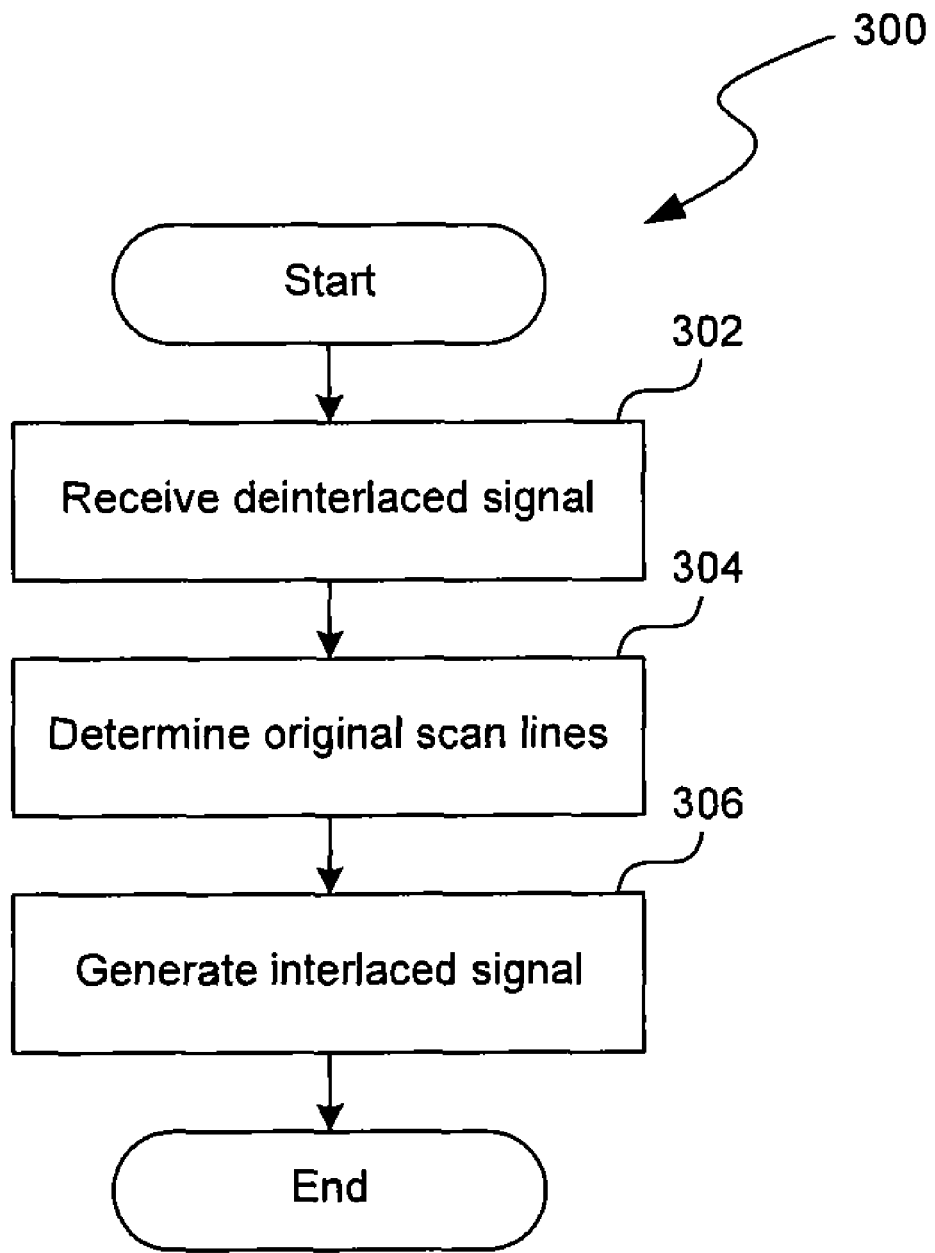
FIG. 3 depicts a flowchart of an example for interlacing a deinterlaced signal.

FIG. 3 depicts a flowchart 300 of an example of a method for generating an interlaced signal. FIG. 3 is intended to illustrate interlacing a deinterlaced signal by detecting original scan lines. In the example of FIG. 3, the flowchart 300 starts at module 302 where a deinterlaced signal is received. The deinterlaced signal can be received by any known and/or convenient device capable of receiving a deinterlaced, or progressive, signal. For example, the deinterlaced signal can be received using a component connection, a composite connection, an RGB connection, an SDI connection, an HD-SDI connection, HDMI connection, serial connection, or any other analog and/or digital connection capable of receiving a deinterlaced signal.

In the example of FIG. 3, the flowchart 300 continues at module 304 where original scan lines are determined. The original scan lines can be determined using any known and/or convenient technique, including calculating new scan lines and comparing the new scan lines to scan lines in the frame. In other embodiments, the high vertical frequency content of the scan lines can be analyzed.

In the example of FIG. 3, the flowchart 300 continues at module 306 where an interlaced signal is generated. The interlaced signal can be generated using any known and/or convenient technique. For example, the original scan lines can be used to generate an even field and an odd field.

Figure 4:
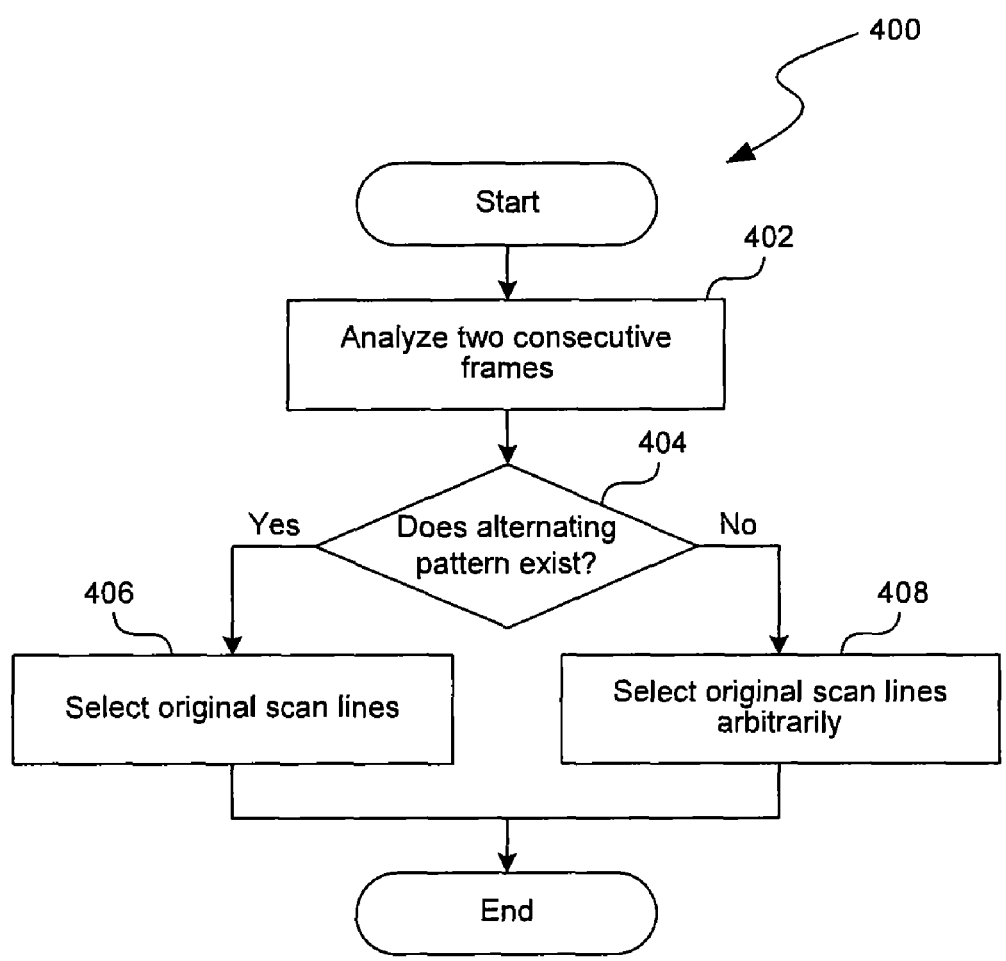
FIG. 4 depicts a flowchart of an alternate example for interlacing a deinterlaced signal.

FIG. 4 depicts a flowchart 400 of an example of a method for selecting original scan lines. FIG. 4 is intended to illustrate the detection and use of an alternating pattern to select original scan lines. In the example of FIG. 4, the flowchart 400 starts at module 402 where two consecutive frames are analyzed. The two consecutive frames can be analyzed using any known and/or convenient device or technique capable of discerning whether an alternating pattern exists.

In the example of FIG. 4, the flowchart 400 continues at decision point 404 where it is determined whether an alternating pattern exists. If an alternating pattern exists (404—Yes), then original scan lines are selected based on the alternating pattern and/or calculations performed on the scan lines in the signal (module 406). If an alternating pattern does not exist (405—No), then the original scan lines are chosen arbitrarily (module 408).

In some embodiments, an alternating pattern does not exist because the deinterlaced signal was created by a weaving technique. Using the weaving technique, both the odd and even scan lines are original scan lines. In such an embodiment, arbitrarily choosing either then even scan lines or odd scan lines as the original scan lines would yield correct results. If at a later time an alternating pattern emerged, then original scan lines can be chosen based on the alternating pattern and/or calculations of the scan lines rather than arbitrarily.

Figure 5:
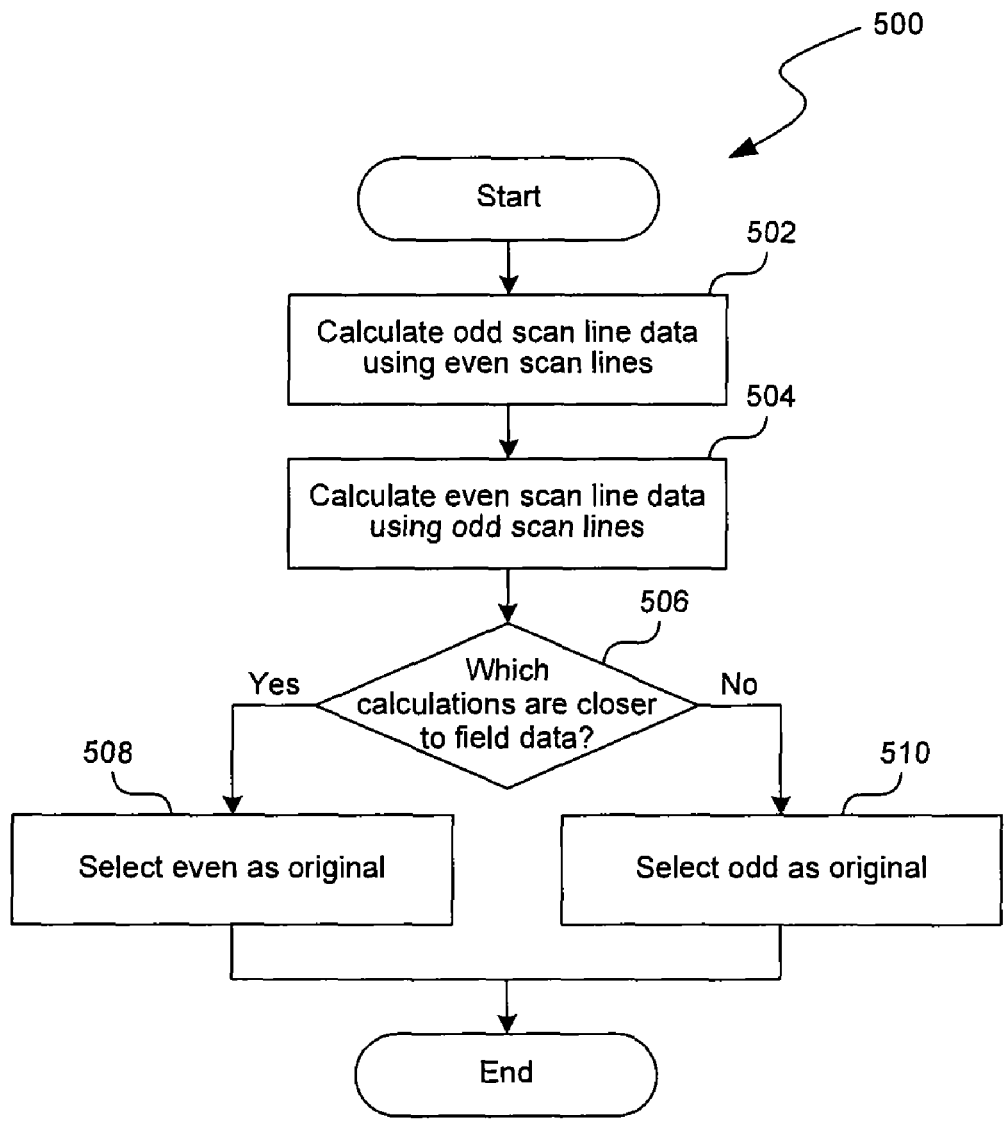
FIG. 5 depicts a flowchart of an alternate example for interlacing a deinterlaced signal.

FIG. 5 depicts a flowchart 500 of an example of a method for selecting original scan lines. FIG. 5 is intended to illustrate an embodiment which calculates and compares scan lines to determine original scan lines. In the example of FIG. 5, the flowchart 500 starts at module 502 where odd scan line data are calculated using even scan lines. The odd scan line data can be calculated using any known and/or convenient technique, including techniques that are similar to vertical interpolation.

In the example of FIG. 5, the flowchart 500 continues at module 504 where even scan line data are calculated using odd scan lines. The even scan line data can be calculated using any known and/or convenient technique, including techniques that are similar to vertical interpolation. Further, in certain embodiments, the calculations of the odd scan line data and even scan line data can be stored in memory and/or temporary memory.

In the example of FIG. 5, the flowchart 500 continues at decision point 506 where it is determined which calculations are closer to actual frame data. If the calculated odd scan lines are closer to the odd scan lines in the frame (506—Odd), then the even scan lines are selected as the original scan lines (module 508). If the calculated even scan lines are close to even scan lines in the frame (506—Even), then the odd scan lines are selected as the original scan lines (module 510).

In certain embodiments, closeness is determined by taking a magnitude of a difference between calculated scan lines and scan lines in the frame. The closer scan lines have the lowest difference magnitude. In other embodiments, any known and/or convenient technique can be used to determine which calculated scan lines are closer to the scan lines in the frame.

Figure 6:
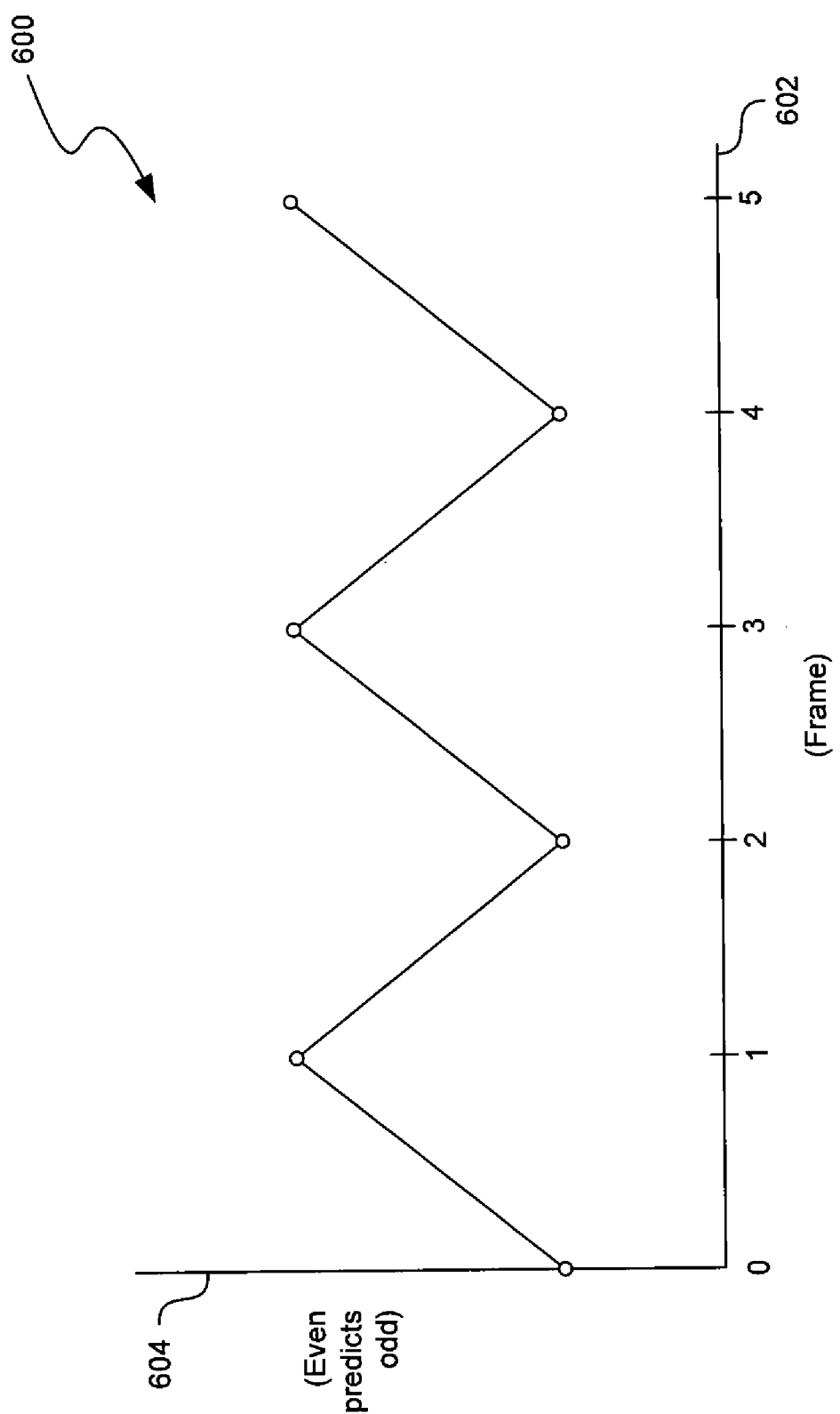
FIG. 6 depicts a graph of an example of an alternating pattern.

FIG. 6 depicts a graph 600 of an example of an alternating pattern. In the example of FIG. 6, the graph has an X-axis 602 and a Y-axis. The X-axis 602 denotes the frames while the Y-axis 604 denotes even predicts odd. In one embodiment, even predicts odd conveys that when odd scan lines are calculated from even scan lines and even scan lines are calculated from odd scan lines, the calculated odd scan lines are closer to the odd scan lines in the frame than the calculated even scan lines are to the even scan lines in the frame. Thus, in this embodiment, even predicts odd indicates that the even scan lines predict/calculate the odd scan lines better than the odd scan lines predict/calculate the even scan lines. In certain embodiments, closeness, as represented by the Y-axis, can be the magnitude of a difference between scan lines.

As shown in the example of FIG. 6, the magnitude of the difference between the calculated odd scan lines and odd scan lines in Frame 0 is lower than the magnitude of the difference between calculated even scan lines and even scan lines in Frame 0. Thus, the even scan lines predict the odd scan lines better than the odd scan lines predict the even scan lines. In Frame 1, the magnitude of the difference between the calculated odd scan lines and odd scan lines in Frame 1 is higher than the magnitude of the difference between calculated even scan lines and even scan lines in Frame 1. Thus, the even scan lines do not predict the odd scan lines better than the odd scan lines predict the even scan lines. In Frame 2, the magnitude of the difference between the calculated odd scan lines and odd scan lines in Frame 2 is lower than the magnitude of the difference between calculated even scan lines and even scan lines in Frame 2. Thus, the even scan lines predict the odd scan lines better than the odd scan lines predict the even scan lines. In Frame 3, the magnitude of the difference between the calculated odd scan lines and odd scan lines in Frame 3 is higher than the magnitude of the difference between calculated even scan lines and even scan lines in Frame 3. Thus, the even scan lines do not predict the odd scan lines better than the odd scan lines predict the even scan lines. The pattern repeats for Frames 4 and 5.

As shown in the example of FIG. 6, the pattern of even scan lines predicting odd scan lines better than odd scan lines predicting even scan lines alternates frame one frame to the next. The alternating pattern suggests that the original scan lines are the even scan lines in Frames 0, 2 and 4. In some embodiments, if the pattern continues for a predetermined number of frames, original scan lines can selected and locked. Furthering the embodiment, even and odd fields can be generated using the original scan lines to produce an interlaced signal.

Figure 7:
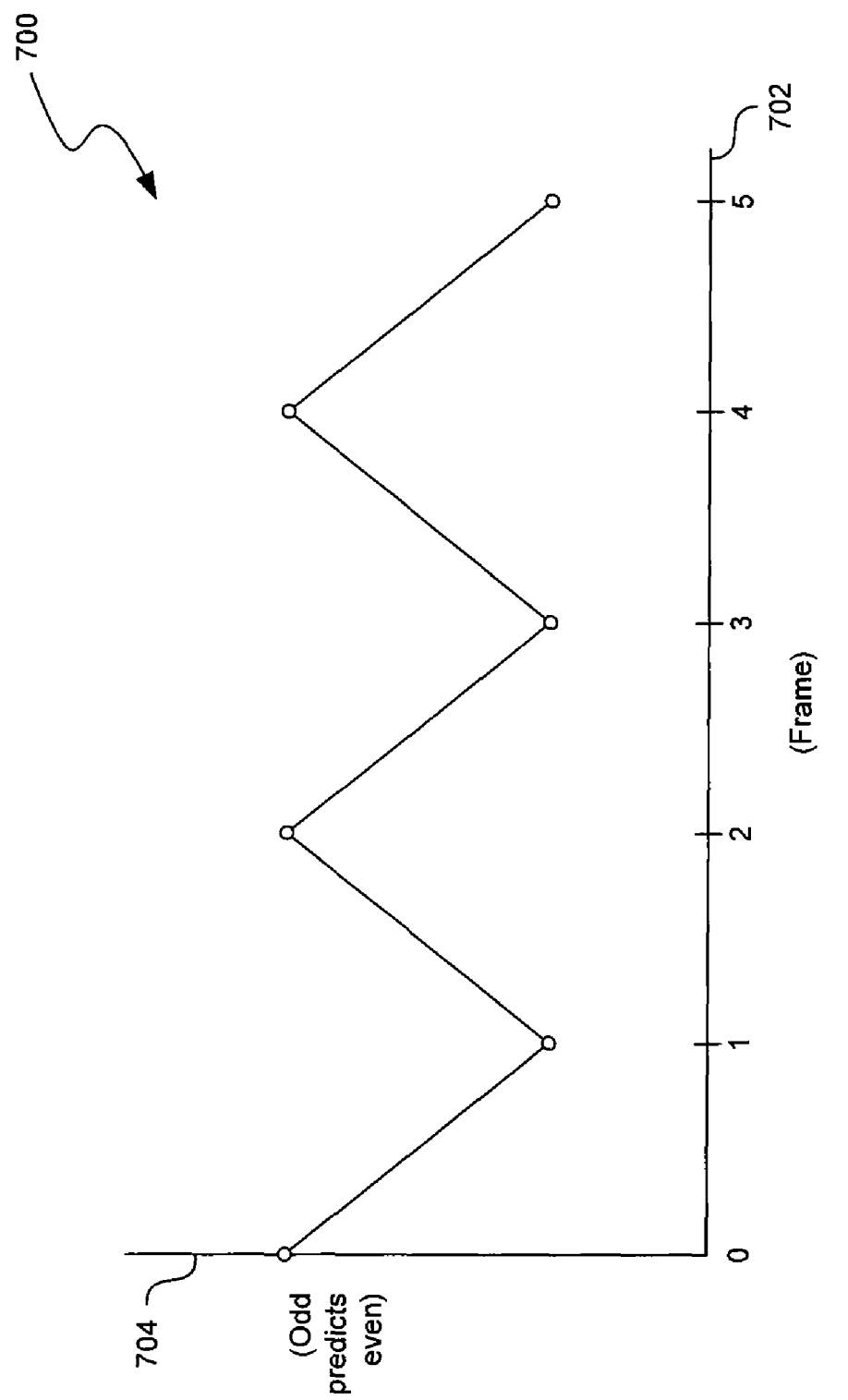
FIG. 7 depicts a graph of an alternate example of an alternating pattern.

FIG. 7 depicts an alternate graph 700 of an example of an alternating pattern. In the example of FIG. 7, the graph 700 has an X-axis 702 and a Y-axis. The X-axis denotes the frames while the Y-axis denotes odd predicts even. In one embodiment, odd predicts even conveys that when even scan lines are calculated from odd scan lines and odd scan lines are calculated from even scan lines, the calculated even scan lines are closer to the even scan lines in the frame than the calculated odd scan lines are to the odd scan lines in the frame. Thus, in this embodiment, odd predicts even indicates that the odd scan lines predict/calculate the even scan lines better than the even scan lines predict/calculate the odd scan lines. In certain embodiments, closeness, as represented by the Y-axis, can be the magnitude of a difference between scan lines.

As shown in the example of FIG. 7, the magnitude of the difference between the calculated even scan lines and even scan lines in Frame 0 is higher than the magnitude of the difference between calculated odd scan lines and odd scan lines in Frame 0. Thus, the odd scan lines do not predict the even scan lines better than the even scan lines predict the odd scan lines. In Frame 1, the magnitude of the difference between the calculated even scan lines and even scan lines in Frame 1 is lower than the magnitude of the difference between calculated odd scan lines and odd scan lines in Frame 1. Thus, the odd scan lines predict the even scan lines better than the even scan lines predict the odd scan lines. The pattern repeats for Frames 2, 3, 4 and 5.

As shown in the example of FIG. 7, the pattern of odd scan lines predicting even scan lines better than even scan lines predicting odd scan lines alternates frame one frame to the next. The alternating pattern suggests that the original scan lines are the odd scan lines in Frames 1, 3 and 5. In some embodiments, if the pattern continues for a predetermined number of frames, original scan lines can be selected and locked. Furthering the embodiment, odd and even fields can be generated using the original scan lines to produce an interlaced signal.

Figure 8:
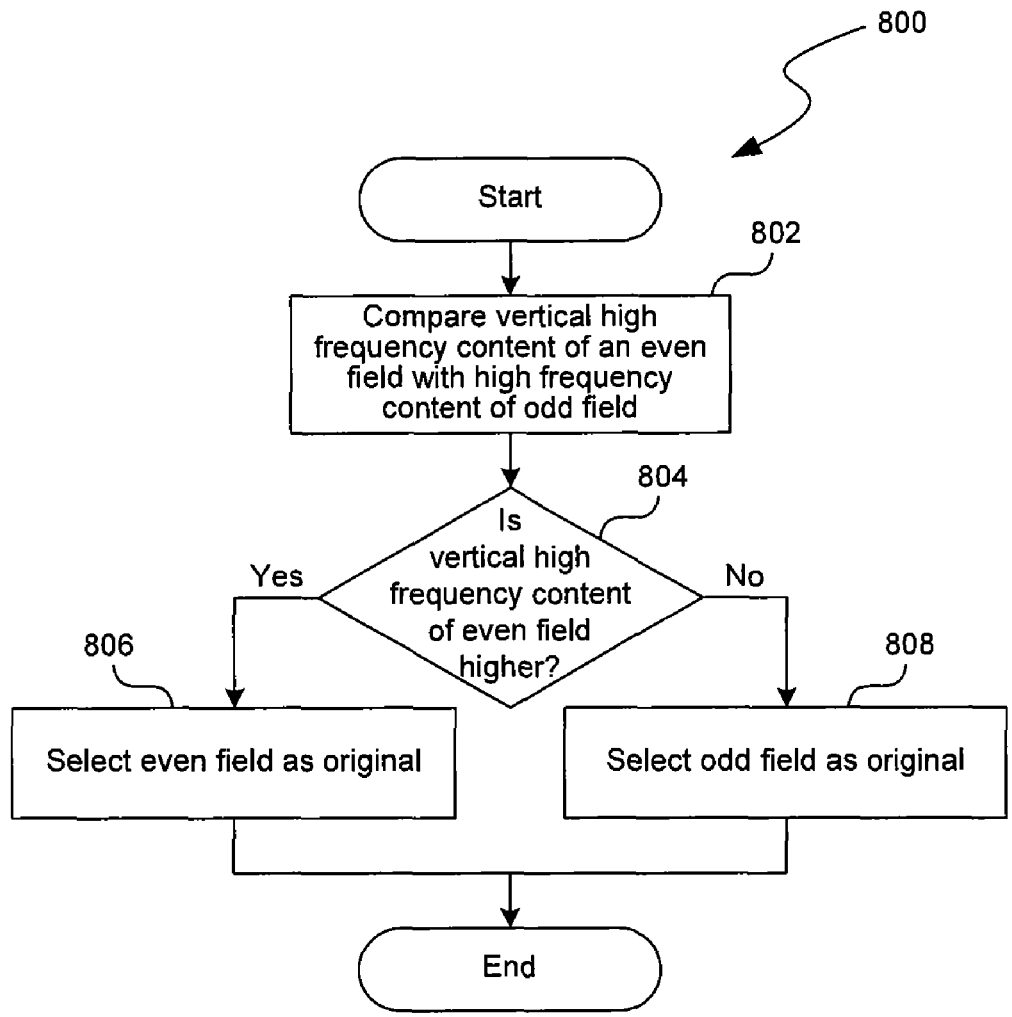
FIG. 8 depicts a flowchart of an alternate example for interlacing a deinterlaced signal.

FIG. 8 depicts a flowchart 800 of an example of a method for interlacing a deinterlaced signal. FIG. 8 is intended to illustrate another method of detecting original scan lines. In the example of FIG. 8, the flowchart 800 starts at module 802 where vertical high frequency content of the even field is compared with the vertical high frequency content of the odd field. The comparison can be facilitated using any known and/or convenient technique. In one embodiment, a difference in pixels in adjacent scan lines in the even and odd field can be calculated and the results compared. In another embodiment, other types of high-pass filters can be applied to the even and odd field and the results from the application can be compared.

In the example of FIG. 8, the flowchart 800 continues at decision point 804 where it is determined whether the vertical high frequency content of the even field is higher than the vertical high frequency content of the odd field. If so (804—Yes), then the even field is selected as the original field (module 806). If not (804—No), then the odd field is selected as the original field (module 808). In alternate embodiments, the vertical high frequency content of the odd field can be checked against the vertical high frequency content of the even field. In other embodiments, the techniques discussed previously can be used in conjunction with these, or any other techniques discussed herein, to generate an interlaced signal.

As used herein, the term "embodiment" means an embodiment that serves to illustrate by way of example but not limitation.

It will be appreciated to those skilled in the art that the preceding examples and embodiments are exemplary and not limiting to the scope of the invention. It is intended that all permutations, enhancements, equivalents, and improvements thereto that are apparent to those skilled in the art upon a reading of the specification and a study of the drawings are included within the true spirit and scope of the invention. It is therefore intended that the following appended claims include all such modifications, permutations and equivalents as fall within the true spirit and scope of the invention.

The invention claimed is:

1. A method for generating an optimized deinterlaced signal from a deinterlaced input signal, the method comprising:
receiving, at a device, a deinterlaced input signal, the deinterlaced input signal having first and second input frames;
wherein, each of the first and second input frames includes even scan lines and odd scan lines;
identifying a first set of original scan lines in a first input frame of the deinterlaced input signal as one of either the even scan lines or the odd scan lines of the deinterlaced input signal;
wherein, in a second input frame which is immediately following the first input frame:
even scan lines of the second input frame of the deinterlaced input signal are identified as a second set of original scan lines, if the odd scan lines are selected for the first input frame;
odd scan lines of the second input frame of the deinterlaced input signal are identified as the second set of original scan lines if the even scan lines are selected for the first input frame;
generating a first optimized frame of the optimized deinterlaced signal using the first set of original scan lines;
generating a second optimized frame of the optimized deinterlaced signal using the second set of the original scan lines;
wherein the second optimized frame of the optimized deinterlaced signal follows the first optimized frame.

2. A method as recited in claim 1, further comprising:
providing the optimized deinterlaced signal as an output.

3. A method as recited in claim 2, wherein the optimized deinterlaced signal is generated using edge detection techniques and cadence detection techniques.

4. A method as recited in claim 1, wherein the deinterlaced input signal is received from a set-top box or progressive DVD player.

5. A method as recited in claim 1, wherein, the first set of original scan lines are identified by:
calculating odd scan lines using the even scan lines in the first input frame thereby generating calculated odd scan lines,
calculating even scan lines using the odd scan lines in the first input frame thereby generating calculated even scan lines,
if the calculated odd scan lines are closer to the odd scan lines in the first input frame than the calculated even scan lines are to the even scan lines in the frame, selecting the even scan lines as the first set of original scan lines,
otherwise, selecting the odd scan lines as the first set of original scan lines.

6. A method as recited in claim 5, wherein closeness is determined by taking a magnitude of a difference between calculated scan lines and scan lines in the first input frame, the closer scan lines having the lowest difference magnitude.

7. A method as recited in claim 5, further comprising:
analyzing two consecutive frames,
if the calculated odd scan lines are closer to the odd scan lines in one frame and the calculated even scan lines are closer to the even scan lines in the other frame, determining that an alternating pattern exists,
wherein the selection of original scan lines is made after determining that the alternating pattern exists.

8. A method as recited in claim 7, wherein the selection of original scan lines is made after a predetermined number of consecutive frames that are consistent with the alternating pattern.

9. A method as recited in claim 1, further comprising:
analyzing a predetermined number of consecutive frames,
determining an alternating pattern based on the predetermined number of consecutive frames,
selecting original scan lines based on the alternating pattern,
if a current selection of original scan lines disagrees with the selected original scan line choice, changing the current selection of original scan lines to be consistent with the alternating pattern.

10. The method of claim 1, further comprising:
comparing a vertical high frequency content of an even field with a vertical high frequency content of an odd field in a frame of the deinterlaced signal,
identifying an original field in the frame as one of the even field or the odd field of the deinterlaced signal;
wherein, the even field is selected as the original field of an original interlaced signal from which the deinterlaced signal is generated if the vertical high frequency content of the even field is higher than the vertical high frequency content of the odd field, otherwise, the odd field is selected as the original field;
using the original field to generate the interlaced signal from the deinterlaced signal.

11. A method as described in claim 10, further comprising:
calculating a difference between pixels in adjacent scan lines in the even field,
calculating a difference between pixels in adjacent scan lines in the odd field.

12. A method as described in claim 10, wherein the comparison is facilitated by using high performance filters on the even field and the odd field.

13. A method as described in claim 1, further comprising, generating an interlaced signal from the deinterlaced signal using the first and second sets of original scan lines.

14. A device for generating an interlaced signal from a deinterlaced input signal comprising:
an input for receiving the deinterlaced signal, the deinterlaced input signal having first and second input frames;
wherein, each of the first and second input frames includes even scan lines and odd scan lines;
an original scan line module for detecting a first set of original scan lines in the first input frame as one of the even scan lines or the odd scan lines of the deinterlaced input signal;
wherein, in a second input frame which is immediately following the first input frame:
even scan lines of the second input frame of the deinterlaced input signal are identified as a second set of original scan lines, if the odd scan lines are selected for the first input frame;
odd scan lines of the second input frame of the deinterlaced input signal are identified as the second set of original scan lines if the even scan lines are selected for the first input frame;
an output for providing an interlaced signal from the deinterlaced input signal using the first and second sets of original scan lines.

15. A device as recited in claim 14, further comprising:
an alternate pattern detector, the alternate pattern detector being capable of analyzing at least two frames and determining whether a toggle pattern exists signifying close calculations of scan lines followed by far calculations of scan lines.

16. A device as recited in claim 15, wherein the alternate pattern detector uses even scan lines to calculate odd scan lines for the two frames and uses odd scan lines to calculate even scan lines for the two frames, the alternate pattern detector further determining an alternating pattern exists if the calculated odd scan lines are closer to the odd scan lines in one frame and the calculated even scan lines are closer to the even scan lines in the other frame.

17. A device as recited in claim 16, further comprising:
a selector, the selector being capable of selecting the even scan lines as being original scan lines in a third frame if the calculated odd scan lines are closer to the odd scan lines in the first frame, the selector being further capable of selecting the odd scan lines as being original scan lines in the third frame if the calculated even scan lines are closer to the even scan lines in the first frame.

18. A device as recited in claim 17, wherein the selection is performed after 16 consecutive frames that are consistent with the alternating pattern.

19. A device as recited in claim 18, further comprising:
a buffer to store previous frame data,
wherein the buffer is a shift-register or a counter.

20. A device as recited in claim 14, further comprising:
a second input for receiving the interlaced signal with original scan lines,
a deinterlacer for optimally deinterlacing the interlaced signal,
a second output for providing an optimized deinterlaced signal.

21. A device as recited in claim 20, wherein a single chip receives the deinterlaced input signal and outputs the optimized deinterlaced signal.

22. A method, comprising:
receiving, at a device, a deinterlaced input signal, the deinterlaced input signal having first and second input frames,
wherein, each of the first and second input frames includes even scan lines and odd scan lines;
identifying a first set of original scan lines in a first input frame of the deinterlaced input signal as one of either the even scan lines or the odd scan lines of the deinterlaced input signal;
wherein, in a second input frame which is immediately following the first input frame:
even scan lines of the second input frame of the deinterlaced input signal are identified as a second set of original scan lines, if the odd scan lines are selected for the first input frame;
odd scan lines of the second input frame of the deinterlaced input signal are identified as the second set of original scan lines if the even scan lines are selected for the first input frame.

23. The method of claim 22, further comprising:
using the first and second sets of original scan lines to generate an output signal;
wherein, the output signal is an interlaced signal.

24. The method of claim 22, further comprising:
using the first and second sets of original scan lines to generate an output signal;
wherein, the output signal is an optimized deinterlaced signal.

25. The method of claim 22, further comprising, generating an optimized deinterlaced signal from the first and second sets of original scan lines each of which is one of either the even scan lines or the odd scan lines.

* * * * *